United States Patent
Reitan, Jr.

[11] Patent Number: 5,907,568
[45] Date of Patent: May 25, 1999

[54] INTEGRATED PRECISION APPROACH RADAR DISPLAY

[75] Inventor: Edwin Howard Reitan, Jr., Omaha, Nebr.

[73] Assignee: ITT Manufacturing Enterprises, Inc., Wilmington, Del.

[21] Appl. No.: 08/754,913

[22] Filed: Nov. 22, 1996

[51] Int. Cl.⁶ .................................................. G01S 13/95
[52] U.S. Cl. ........................... 342/26; 342/33; 342/34; 342/181; 342/460
[58] Field of Search ........................... 342/26, 460, 176, 342/33, 34, 35, 36, 181

[56] References Cited

U.S. PATENT DOCUMENTS

| | | | |
|---|---|---|---|
| 3,986,432 | 10/1976 | Young | 89/45 |
| 3,999,007 | 12/1976 | Crane | 342/33 X |
| 4,283,705 | 8/1981 | James et al. | 340/973 |
| 4,283,725 | 8/1981 | Chisholm | 342/174 |
| 4,352,105 | 9/1982 | Harney | 395/182.02 |
| 4,368,517 | 1/1983 | Lovering | 364/428 |
| 4,429,312 | 1/1984 | Chisholm | 342/410 |
| 4,490,986 | 1/1985 | Huguenin | 340/527 X |
| 4,990,921 | 2/1991 | Chisholm | 342/35 |
| 5,097,268 | 3/1992 | Bauer, Jr. et al. | 342/160 |
| 5,111,400 | 5/1992 | Yoder | 364/424.01 |
| 5,208,601 | 5/1993 | Hart | 342/33 |
| 5,262,773 | 11/1993 | Gordon | 340/968 |
| 5,351,045 | 9/1994 | Cornman | 340/968 |
| 5,490,239 | 2/1996 | Myers | 395/129 |
| 5,523,759 | 6/1996 | Gillberg et al. | 342/26 |
| 5,654,890 | 8/1997 | Nicosia et al. | 364/428 |
| 5,657,009 | 8/1997 | Gordon | 340/968 |

OTHER PUBLICATIONS

E.H. Reitan, S.H. Saib, "Computer graphics in an automatic aircraft landing system", pp. 689–700, AFIPS Conference Proceedings, vol. 45, 1976.

E.H. Reitan, S.H. Saib, "Interactive Computer Graphics in an All–Weather Landing System", pp. 1–4, IEE International Conference, 22–29 Nov. 1976.

*Primary Examiner*—John B. Sotomayor
*Attorney, Agent, or Firm*—Freilich, Hornbaker & Rosen

[57] ABSTRACT

An improved precision approach radar (PAR) system using an integrated digital display for displaying the relative position of one or more targets, e.g., aircraft, to a preferred glide path and azimuth course line. A preferred PAR system uses a radar head which emits a pair of scanned radar beams and interprets reflected responses to individually determine aircraft targets, weather patterns and/or obstructions and displays each reflection category as a different pattern, preferably color coded, on an essentially non-flickering monitor.

26 Claims, 10 Drawing Sheets

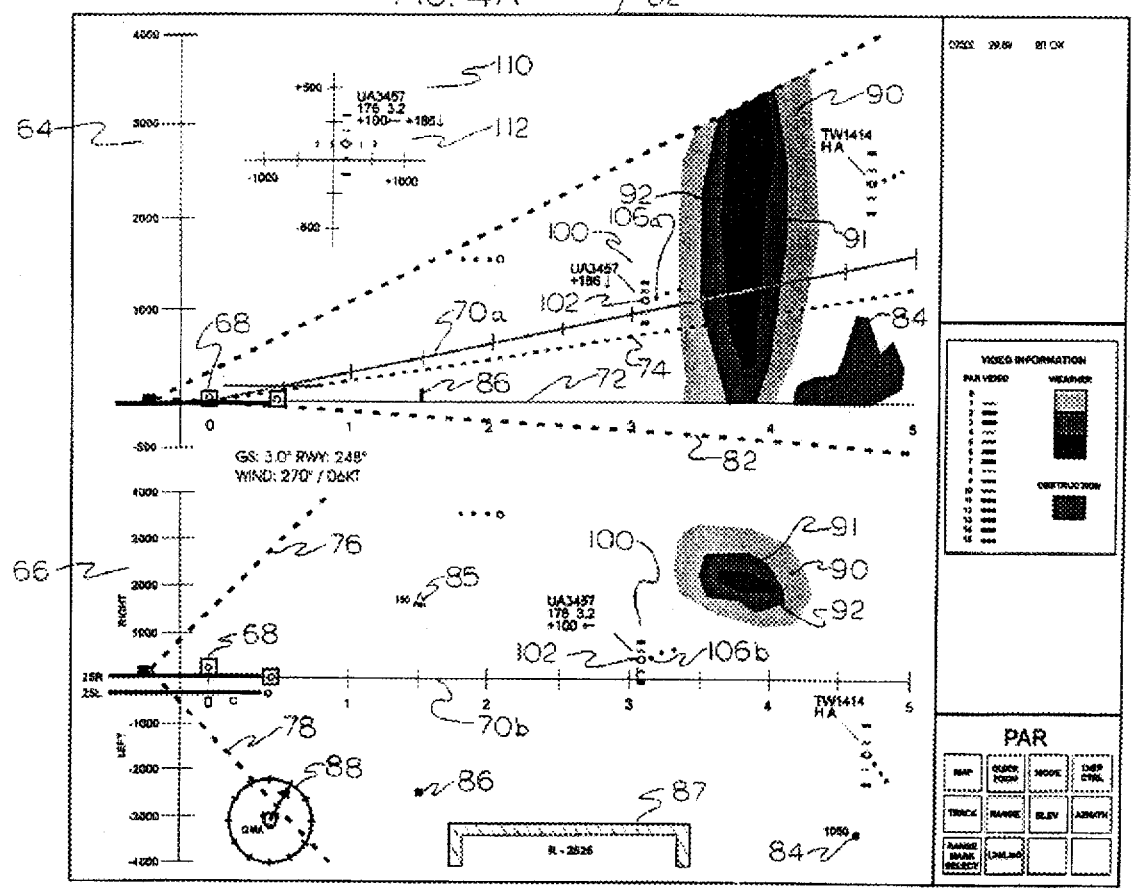

Synthetic Target/Track Graphic Generator

INTEGRATED PRECISION APPROACH RADAR DISPLAY

BACKGROUND OF THE INVENTION

The present invention generally relates to precision approach radar (PAR) systems for displaying information to an air traffic controller useful for guiding an aircraft along a preferred glideslope approach to a runway.

Precision approach radar systems for guiding an aircraft to a runway touchdown point are well known. Such systems typically use a pair of radar beams in a microwave radio frequency (RF) band emitted from a radar head disposed proximate to the runway touchdown point. The radar beams are respectively scanned horizontally and vertically to determine the relative azimuth and elevation positions of one or more targets, e.g., aircraft, in the vicinity of the radar head. In an early exemplary system, as disclosed in U.S. Pat. No. 2,649,581 to Tasker et al., a single monitor, e.g., a CRT (cathode ray tube) video monitor, displays side and top views of a preferred glideslope and the relative position of any detected aircraft. The display is generated by sweeping electron beams across the face of a CRT that are synchronized to the scanning of the radar beams from the radar head. These swept electron beams are typically highlighted in response to video signals produced by analog receivers in response to the radar beams reflected from targets. A typical sweep pattern repeats at least once a second and phosphors on the CRT are chosen so that patterns persist long enough for viewing by an operator, albeit in a somewhat darkened room. The video signal resulting from the reflected radar beam is typically subject to various noise sources from ground obstructions (e.g., mountains or towers), weather systems, as well as various sensitivities to different portions of each target. Filters are typically used to minimize these noise sensitivities to try to determine the "true" relative position of the aircraft. While such systems are relatively effective, they impose a significant workload on highly-trained operators to interpret the resultant noisy and flickering (due to the persistence of the CRT phosphors) display. The operator is presented with a bright line of video, indicating the scanning of the radar, and has to detect targets in the dim residual persistence trails on the screen. This leads to operator visual fatigue. A paper by E. H. Reitan and S. H. Saib presented at the Institution of Electrical Engineers (IEE) International Conference on "The Future of Aircraft All-Weather Operations," London, England, Nov. 22–29, 1976 entitled "Interactive Computer Graphics in an All-Weather Landing System" described an earlier implementation of a synthetic color random scan display system to reduce the operator's workload.

SUMMARY OF THE INVENTION

The present invention is directed to a precision approach radar (PAR) system for producing an integrated digital display for an air traffic controller showing, in addition to the position of an aircraft relative to a runway touchdown point and a preferred glideslope, localized weather systems and/or obstructions, e.g., mountains or towers.

In accordance with a significant feature of a preferred embodiment, a common radar head emits a pair of radar beams, i.e., azimuth and elevation, and receives reflected radar signals that are processed by a signal processor to isolate sets of data corresponding to aircraft targets, weather systems and obstructions.

In accordance with another significant feature of a preferred embodiment, reflected radar signals are processed to determine a set of target data corresponding to each aircraft target. Each said set of data is digitally displayed on a monitor as a target icon appropriately positioned relative to a digital representation of the runway and preferred glideslope. Each target icon is preferably visually coded in accordance with the intensity of reflected radar signals.

In accordance with a further aspect of the preferred embodiment, the target data set is processed to determine the centroid, i.e., weighted mean, which is displayed as a portion of a generated target icon, a symbol which indicates target position and intensity distribution. The target icon indicating reflectivity to each beam scanning the target is preferably coded, e.g., color coded, to facilitate rapid interpretation by an air traffic controller.

In accordance with a still further aspect of the preferred embodiment, the reflected radar signals are also processed to derive weather system data which are also displayed on the monitor positioned appropriately with respect to the runway. The weather system data are preferably visually coded, e.g., by a plurality of colors, to indicate detected weather intensities.

In accordance with an additional aspect of the preferred embodiment, the reflected radar signals are also processed to derive obstruction data which are displayed on the monitor appropriately positioned with respect to a runway approach region. The obstruction data are preferably visually coded, e.g., by a distinct color.

A preferred display in accordance with the invention depicts targets, weather and obstructions, in both top and side views, relative to a runway. Additionally, the reflected radar signals are preferably used to also show a WHI (width-height indicator) on the display depicting the position of an aircraft as viewed from the aircraft.

The novel features of the invention are set forth with particularity in the appended claims. The invention will be best understood from the following description when read in conjunction with the accompanying drawings.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

DESCRIPTION OF THE PREFERRED EMBODIMENTS

The present invention relates to a precision approach radar (PAR) system for producing an integrated digital display for an air traffic controller showing, in addition to the position of an aircraft relative to a runway touchdown point and a preferred glideslope, localized weather systems and/or obstructions, e.g., mountains or towers. Preferred embodiments of the invention produce an essentially non-flickering display on a raster-scanned monitor showing top and side views of aircraft targets relative to a preferred glideslope, integrated with a coded representation of localized weather systems and fixed obstructions, e.g., mountains or towers. Each aircraft target is preferably displayed as a target icon which represents a distribution according to the intensity of reflected radar signals, preferably color coded to facilitate operator interpretation.

Figure 1:
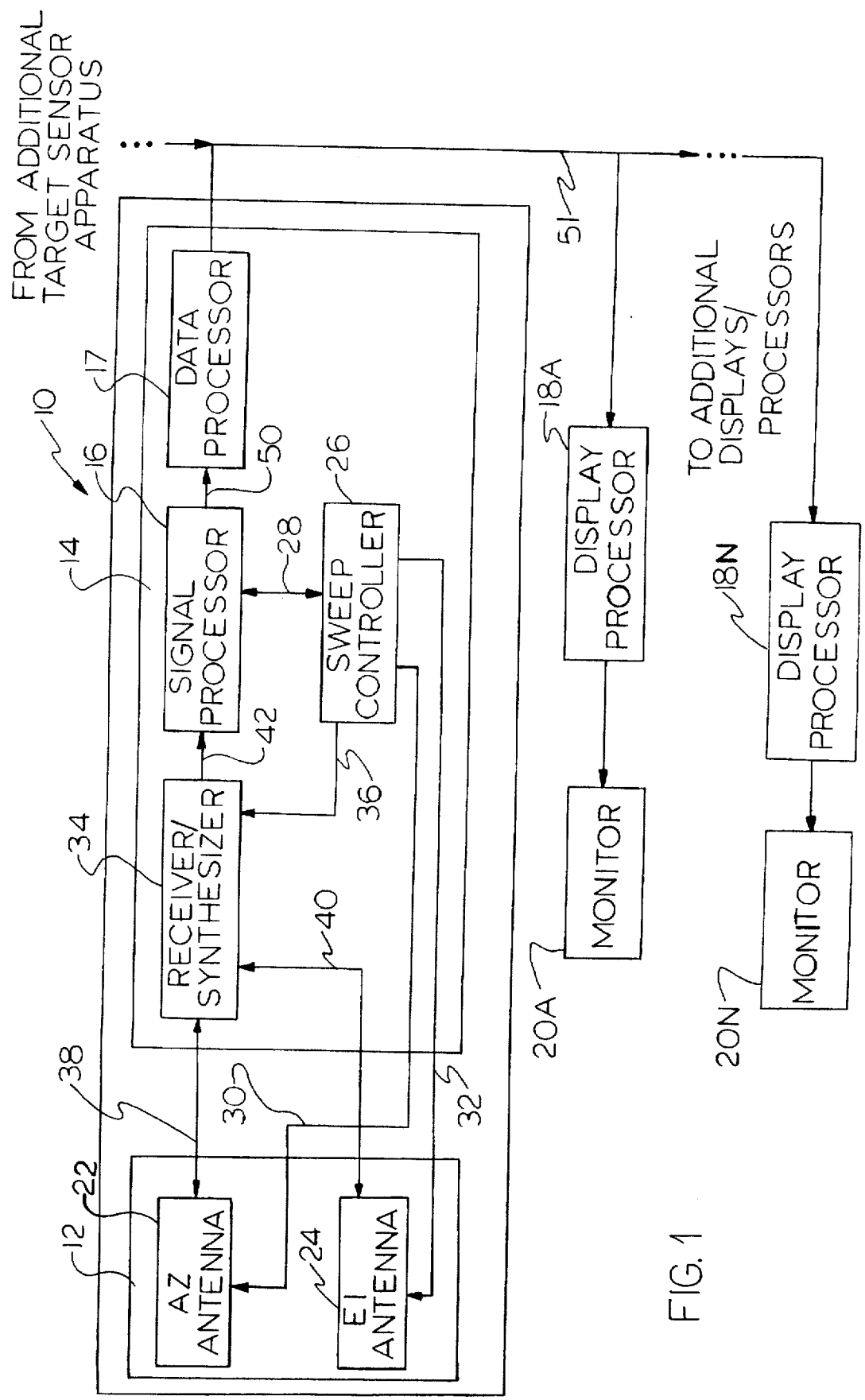
FIG. 1 comprises a top level block diagram of an exemplary embodiment of the present invention primarily showing a common radar head for emitting radar beams and retrieving reflected responses, a signal processor for extracting obstruction, weather and target (aircraft) data and a display processor for displaying said data as an integrated display on a monitor.

FIG. 1 comprises a top level block diagram of an exemplary embodiment of a precision approach radar (PAR) system 10 primarily comprised of a common radar head 12 located proximate to a prescribed runway landing point for emitting pulsed radar beams and retrieving reflected responses from a reflector (e.g., an aircraft, weather system or obstruction), a radar head controller 14 (including a signal processor 16, described further below in reference to FIGS. 7,8, for extracting obstruction, weather and target, e.g., aircraft data), a data processor 17 (described further below in reference to FIG. 7) and one or more display processors 18 for displaying said extracted data as an integrated display on one or more monitors 20. Monitor 20 is preferably raster-scanned at a high rate to generate an essentially non-flickering display. However, other display technologies including CRT and flat panel (plasma and LCD) monitors are considered within the scope of the present invention. The radar head controller 14 uses the radar head 12, primarily comprised of azimuth (Az) 22 and elevation (El) 24 antennas, to emit a pair of scanned radar beams within predefined arcs, preferably within a microwave radio frequency (RF) band, and retrieve reflected radar beams from targets. By controlling the azimuth and elevation scan arcs and correlating the time delay and Doppler shifts corresponding to the emitted and reflected radar beam pulses, a three-dimensional map of airspace in the vicinity of the radar head 22 (and consequently a runway landing point) is obtained.

To control this process, the signal processor 16 bidirectionally communicates with sweep controller 26 via control signal path 28, e.g., a VME bus, to generate azimuth sweep control 30 and elevation sweep control 32 signals to direct the azimuth and elevation 24 antenna's radar beam emissions. While it is preferable to coarsely mechanically position the radar head 12 to emit a scanning pattern originating proximate to the landing point and encompassing the preferred glideslope, it is preferable to then electronically aim the radar beams from the radar head 12 within the predefined arcs. However, mechanical scanning apparatus are also considered within the scope of the present invention.

The sweep controller instructs receiver/synthesizer 34 via synthesizer control 36 to periodically generate a plurality of pulsed radar waveform signals having different pulsewidths, pulse patterns and repetition intervals (PRI) which are used to instruct the azimuth 22 and elevation 24 antennas respectively via signal paths 38, 40 to emit radar beams in coordination with the scanning pattern. Some time period later, as determined by the distance to a target, reflected radar beams are returned to the azimuth 22 and elevation 24 antennas and respectively communicated via paths 38, 40 to receiver/synthesizer 34. The receiver/synthesizer 34 processes reflected radar signals and returns received radar signals via path 42.

The ability to detect the relative position and velocity of a target with a radar beam alters with the frequency and pulsewidth of the emitted radar beam as shown in Tables I and II. Table I shows that for the exemplary waveforms of Table II, referred to as waveforms 1100–1106, that the minimum and maximum distance sensitivities, i.e., the range coverage are additionally altered with different weather/ precipitation conditions. Therefore, embodiments of the present invention preferably periodically emit a pattern comprised of a plurality (e.g., four) of pulsed radar beams of different frequencies and pulsewidths which are then correlated by the signal processor 16 to (1) retrieve position and weather independent target data and (2) retrieve weather and/or obstruction position data.

TABLE I

Waveform Range Coverage in nmi
Normal Mode = 1100, 1101, 1104, 1105
Heavy Rain Mode = 1100, 1101, 1106, 1105

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 1100 | | | | | | | | | | | | | | |
| 1101 | | | | | | | | | | | | | | |
| 1104 | | | | | | | | | | | | | | |
| 1105 | | | | | | | | | | | | | | |
| 1106 | | | | | | | | | | | | | | |

All-Weather Coverage is Provided by a suite of five waveforms

TABLE II

Four waveforms provide the required coverage and Pd under normal operating conditions

| WAVE-FORM NUMBER | NO. OF PULSES FILL + DATA | PRI μSEC | PULSE-WIDTH μSEC | RANGE COVERAGE NMI | TIME FOR CPI μSEC |
|---|---|---|---|---|---|
| 1100 | 4 + 12 | 69 | 0.5 | 0.5–5.5 | 1,104.0 |
| 1100A | 4 + 12 | 71.1 | 0.5 | 0.5–5.5 | 1,137.6 |
| 1101 | 2 + 11 + 11 | 105 | 18.6 | 1.5–7.0 | 2,520.0 |
| 1101A | 2 + 11 + 11 | 107.1 | 18.6 | 1.5–7.0 | 2,570.4 |
| 1104 | 1 + 11 + 11 | 189.6 | 40.0 | 3.2–12.1 | 4,360.8 |
| 1104A | 1 + 11 + 11 | 191.7 | 40.0 | 3.2–12.1 | 4,409.1 |

TABLE II-continued

Four waveforms provide the required coverage and Pd under normal operating conditions

| WAVE-FORM NUMBER | NO. OF PULSES FILL + DATA | PRI μSEC | PULSE-WIDTH μSEC | RANGE COVERAGE NMI | TIME FOR CPI μSEC |
|---|---|---|---|---|---|
| 1105 | 1 + 11 | 246.3 | 80.0 | 6.4–13.4 | 2,955.6 |
| 1105A | 1 + 11 | 248.4 | 80.0 | 6.4–13.4 | 2,980.8 |

NOTES:
(1) FILL PULSES ARE USED WITH ALL WAVEFORMS TO SUPPRESS SECOND TIME AROUND CLUTTER.
(2) EACH OF THE FOUR WAVEFORMS HAS A GROUP-TO-GROUP STAGGERED VARIANT DESIGNATED WITH THE LETTER "A" WHICH IS USED TO IDENTIFY SECOND TIME AROUND TARGETS.
(3) WAVEFORMS 1101 & 1104 PARTITION 22 DATA PULSES INTO TWO GROUPS OF 11 PULSES, EACH OF WHICH ARE THEN NONCOHERENTLY INTEGRATED FOR ENHANCED DETECTION.

Figure 2:
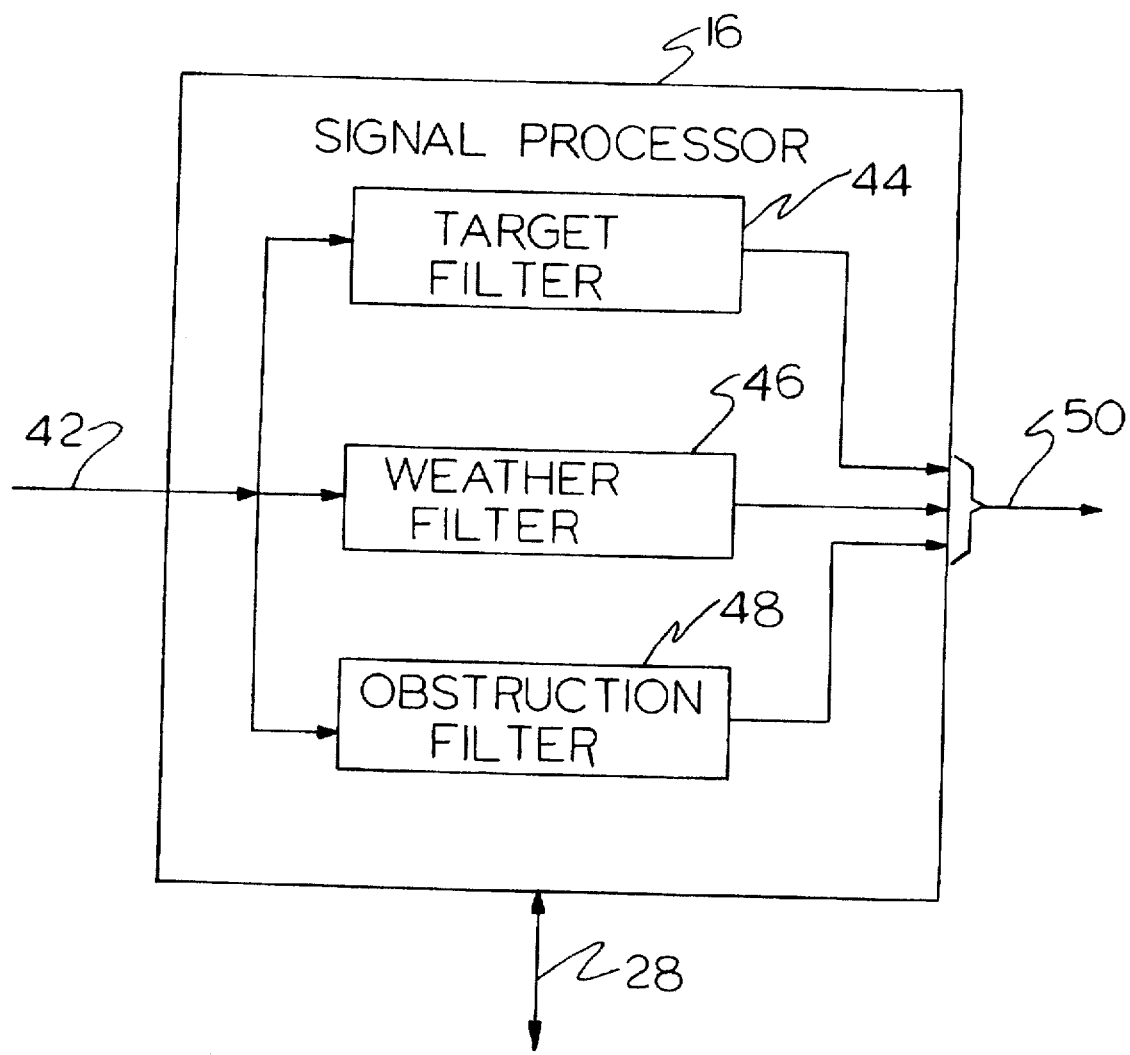
FIG. 2 is a simplified block diagram of the signal processor for individually extracting obstruction, weather and target data from reflected radar beam responses.

The signal processor 16, as shown in FIG. 2, is primarily comprised of target 44, weather 46 and obstruction 48 filters which process the received radar signals on path 42 to respectively isolate moving target (e.g., aircraft), weather and obstruction data. Preferably, filters 44–48 are implemented as software tasks that are executed on a single processor. However, hardware and multiprocessor implementations are also considered within the scope of the present invention. This isolated data is preferably digitally communicated via path 50 to a data processor that additionally develops digital data packet messages for target report plots and tracks. This data is then communicated via path 51 to display processors 18 as data packets, e.g., on a local area network (LAN), e.g., an Ethernet link. However, embodiments using separate and direct data path connections for each data class are also considered to be within the scope of the present invention.

Features of the described architecture can be enhanced to further supplement the present invention. For example, the distance between the display processors 18 and the radar head controller 14 can be significantly increased by buffering the LAN connection, e.g., using a fiber-optic link (not shown). Further, since processed data sets are supplied via a commonly accessible data packet path 51, additional processors and/or monitors can be used to provide additional or alternative displays or functions either locally or remotely by operating on the common data packets received via data packet path 51. For example, the data packets received on path 51 can be relayed to an incoming aircraft so that a display useful for viewing by a pilot, e.g., a width-height indicator display (WHI), can be generated or an automated landing system controller can direct an aircraft to the runway touchdown point.

Also, since the display processors 18 operate upon whatever data is supplied via data packet path 51, additional target sensor apparatus, e.g., other radar systems, laser sensors, etc., can be used to provide similar data packets to supplement or replace the data packets which are otherwise supplied from the radar head controller 14. Finally, due to the use of a LAN connection with a plurality of data sources and data destinations, many known LAN connection architectures can be used.

Moving targets, weather systems, and obstructions have different real world attributes. Moving targets, e.g., aircraft, exhibit velocities in excess of a threshold, e.g., 70 knots, relative to a runway touchdown point and thus their positions typically alter with each scan. Additionally, moving targets are relatively small. In contrast, obstructions, e.g., mountains or towers, are relatively large and have fixed locations relative to the runway touchdown point and thus, subject to measurement errors, will appear at the same location with no appreciable velocity on each scan. Weather systems are much larger than moving targets (e.g., several miles in size) with velocities typically between ±40 knots, dependent upon wind conditions. Therefore, the target filter 44 processes the received radar signals on path 42 to isolate reflected data corresponding to signals reflected with a Doppler shift greater than a first threshold, e.g., 70 knots, and preferably corresponding to an extended size larger than an aircraft. Additionally, target filter 44 retains intensity data corresponding to a plurality of received radar signals intensities that, as explained further below, are subsequently displayed as multiple colors on monitor 20a by display processor 18a. Obstruction filter 48 processes the received radar signals on path 42 to isolate reflected radar data with a Doppler shift of essentially zero. Alternatively, since most obstructions will not change, the obstruction filter 48 can be initialized by a clear day initialization measurement (so as to not confuse the measurement with weather data) or data input by an operator. Additionally, some obstructions, e.g., restricted fly zones and the back side of mountains, are not "visible" to radar beams and corresponding data can be entered by an operator. Weather filter 46 processes the received radar signals resulting from a plurality of different emitted radar signals which have Doppler shifts corresponding to weather radial velocities, e.g., ±40 knots, and extended sizes characteristic of weather systems. The resultant weather data is presented as two or more, color-coded weather levels. As discussed further below, this data is preferably displayed as different colors on the monitor 20a.

Figure 3:
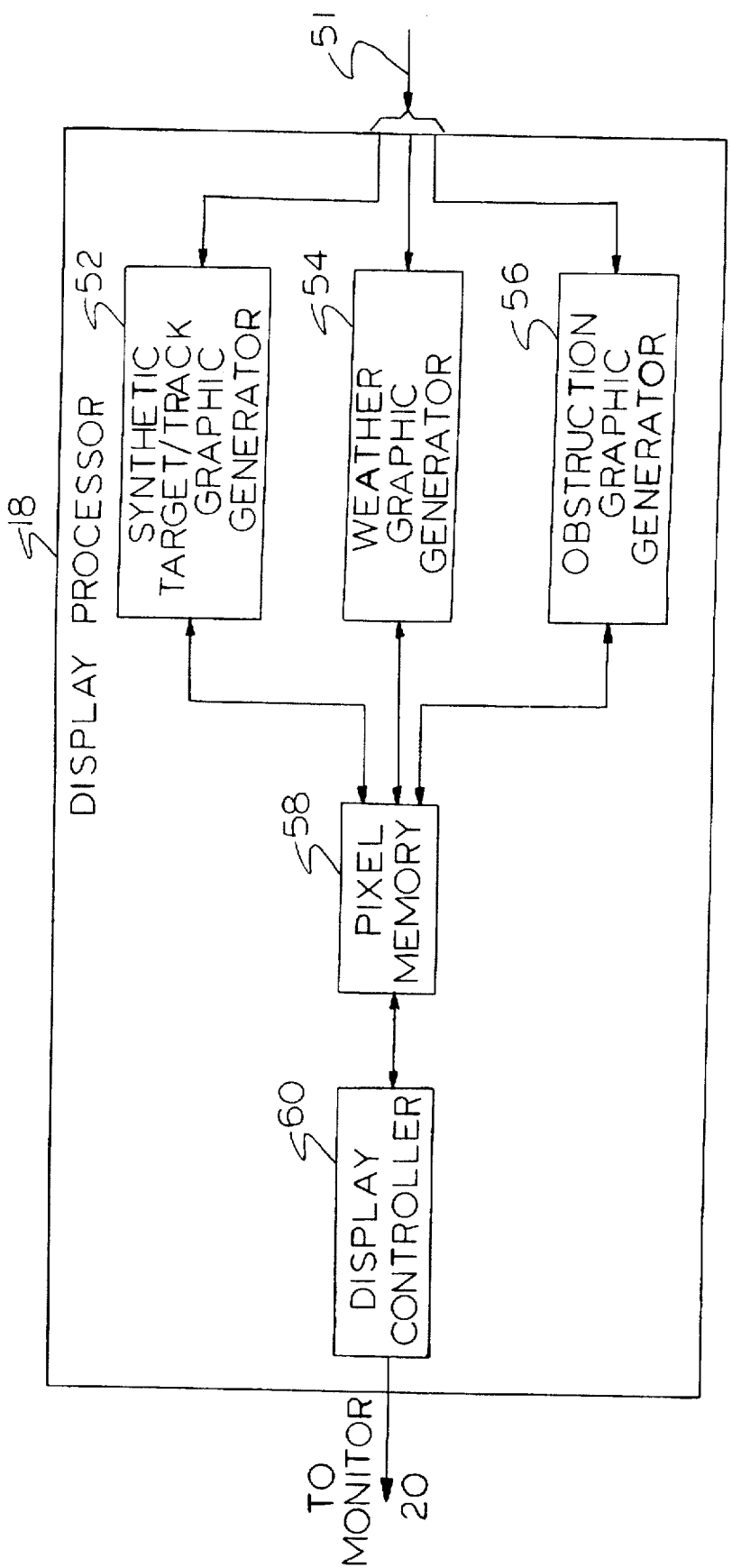
FIG. 3 is a simplified block diagram of the display processor which generates color-coded graphics for displaying the relative position of a target (aircraft) to a preferred glideslope, weather systems and obstructions.

The display processor 18, as shown in FIG. 3, is primarily comprised of synthetic target/track graphic 52, weather graphic 54 and obstruction graphic 56 generators. These generators process digital data received via path 51 from the data processor 17 to generate video data that is placed in pixel memory 58. Display controller 60 accesses pixel memory 58 to drive display monitors 20 using typical graphic user interface implementation mechanisms, e.g., Windows X.11 R6. The functions of each of these graphic generators can best be observed by viewing FIG. 4 which shows an exemplary display 62 of a runway approach region relative to a preferred approach centerline and glidepath. Display 62 is divided into two main sections, a side elevation (El) view 64 and a top azimuth (Az) view 66 for showing the three dimensional relationship between target, weather and obstruction data and a runway touchdown point 68 along a preferred glideslope. The preferred glideslope is shown in side view 64 as glideslope line 70a relative to ground line 72. Additionally, line 74 displays the minimum safe altitude below the glideslope. In the top view 66, the preferred glideslope is displayed as extended runway center line 70b. Viewable reflected data is limited by the horizontal (azimuth) and vertical (elevation) scanning limits. The horizontal scanning limits, typically ±15°, ±10°, +15° −5°, or −5° +15°, are indicated on the display 62 by azimuth limit lines 76, 78. The vertical scanning limits, typically +70° −1° or +6° −1°, are indicated on the display 62 by elevation limit lines 80, 82.

Figure 5:
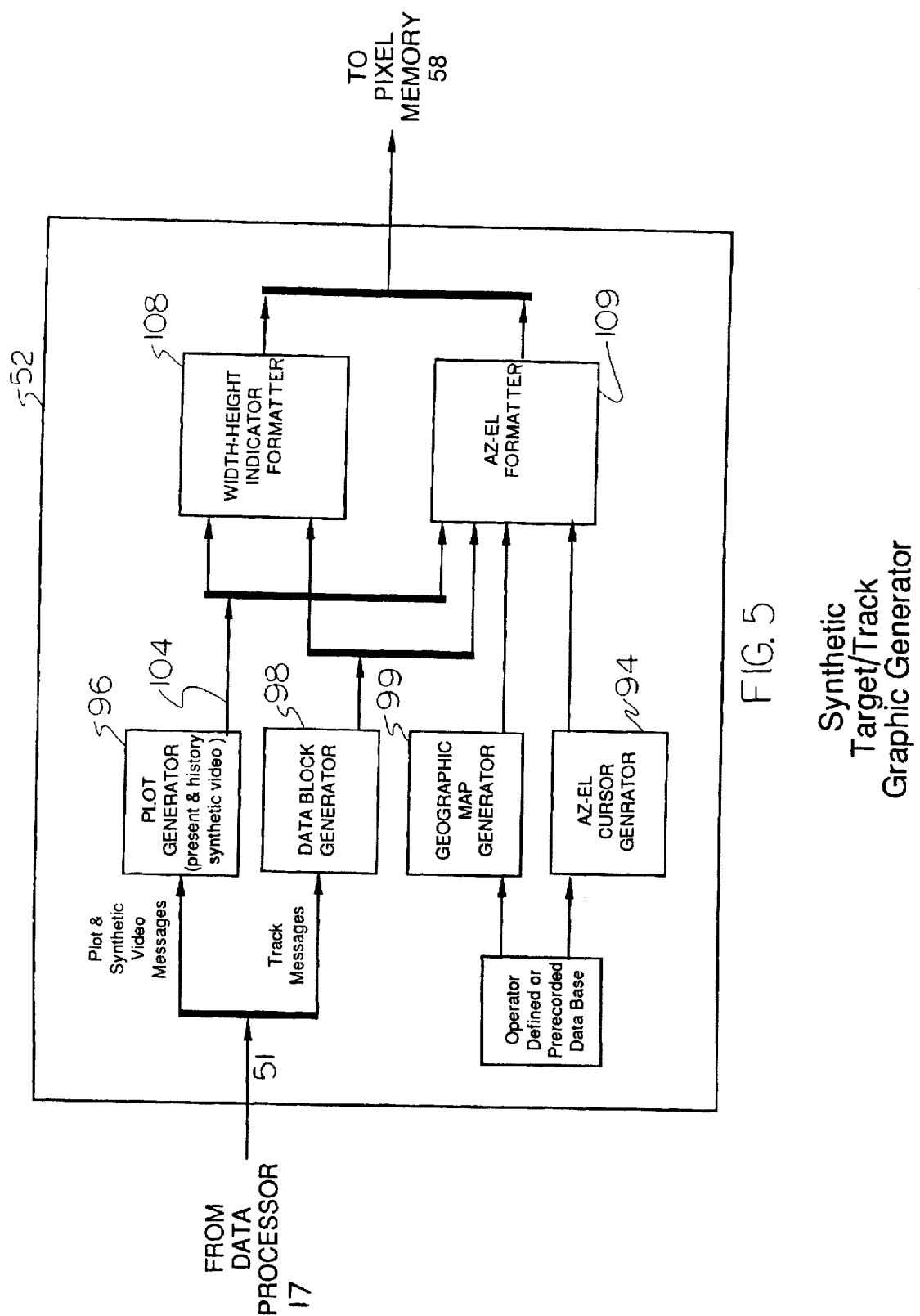
FIG. 5 is a simplified block diagram of a graphic generator for producing the display of FIG. 4.

On display 62, the following exemplary extracted obstructions are shown: mountain 84, and a tower 85. The obstruction graphic generator 56 preferably defines polygon blocks whose limits are defined by the processed obstruction data from the obstruction filter 48. Polygon fill software is then preferably used to fill the interior of the polygon blocks. Obstruction data is preferably supplemented by operator-entered geographic maps which is drawn by the display as vectors, symbols and alphanumerics by the display generator (see FIG. 5). Exemplary map information is shown: building 86, special use areas (restricted area 87 and prohibited and warning areas), obstacles symbols (tower 85) and navigation aids 88 (e.g., VOR, VORDME, VORTAC, NDB, Markers, TACAN, waypoint, and intersections).

After processing by the weather graphic generator 54, weather data extracted by the weather filter 46 and the data processor 17 and transferred via data path 10 is preferably displayed as a weather icon, i.e., a plurality of polygons filled with a series of predefined colors (e.g., shades of blue) corresponding to different weather intensity/precipitation levels as determined by the weather filter 46. On display 62, a weather system is indicated by color-coded patterns 90, 91, 92 which indicate three different weather intensities. The weather graphic generator preferably analyzes weather data from the weather filter 46 to determine boundaries between different weather intensities and then fills the interiors of different intensity polygons with different predefined colors. The color-coded weather display gives the operator, i.e., an air traffic controller, an improved interpretation of the significance of a weather system and its limits so that, when necessary, an approaching aircraft can avoid or anticipate the weather system.

After processing by the target filter 44 and data processor 17, extracted target data is transferred via data path 51 to the synthetic target/track graphic generator 52. The synthetic target/track graphic generator 52 (see FIG. 5) is primarily comprised of an Az-El cursor generator 94, a plot generator 96, a data block generator 98 and a geographic map generator 99 which supply signals to width-height indicator formatter 108 and Az-El formatter 109 which respectively generate WHI and Az-El portions of the display shown in FIG. 4. The Az-El cursor generator 94 primarily generates the previously described side and top views of the preferred glideslope 70a, b, the minimum glideslope 74 and the scanning limit lines 76, 78, 80, 82.

The data processor 17 accumulates target data from the target filter 44 and correlates data within a limited three-dimensional airspace with similar velocities to assign detected targets. The data processor 17 preferably averages the intensities of the data correlated to a detected target and determines a weighted average, i.e., the centroid, position of the detected target. The plot generator 96 generates a target icon graphic 100 for each detected target indicative of this accumulated and calculated data. Preferably, data levels over a preset intensity threshold and corresponding to a detected target are displayed as dots, e.g., a pixel or group of pixels essentially corresponding to a dot or short line segments, e.g., a plurality of pixels. An additional centroid dot 102 is additionally displayed, preferably in a predefined color (e.g., white) corresponding to the calculated centroid. Past positions are presented as history dots. Additionally, the data block generator 98 preferably calculates vertical and horizontal offsets from the preferred glideslope and displays this calculated data along with the current target velocity as alphanumeric data in conjunction with the target icon graphic 100. Optionally, a secondary surveillance radar antenna (not shown) is included with the radar head 12 to request and retrieve identification data from an aircraft target. This identification data is then also displayed in conjunction with the target icon graphic 100 by the data block generator 98. Alternatively, this identification data can be manually entered for each detected target.

Figure 4B:
FIG. 4 (FIGS. 4A and 4B) respectively comprise black-white and color representations of an Azimuth-Elevation (Az-El) display including top and side views of aircraft targets relative to a preferred approach centerline and glide-path integrated with the position of localized weather systems and obstructions.

The target icon graphic 100 may be generated in various manners to communicate to an air traffic controller size and position related information for the detected target. In a preferred embodiment, a predefined number of threshold levels, e.g., sixteen, are utilized and a plurality of vertically offset intensity dots, e.g., lines at the angle of the transmitted beams, corresponding to range bins where reflected radar signals exceed each predefined threshold level contours are distributed around centroid dot 102 (e.g., in a manner similar to a topographical map). By looking at the distribution of the intensity dots that indicate the position of range returns from the angular beams of the radar, the air traffic controller can quickly make a judgment as to the size of the detected target (for aircraft with similar reflecting materials). The air traffic controller can also resolve multiple aircraft which may be in close proximity and verify the accuracy of automatic centroid extraction algorithms which are used to position the aircraft target icon. Additionally, the intensity dots are preferably color-coded, e.g., using up to sixteen different colors as represented in FIG. 4B, to correspond to the predefined thresholds. Other configurations of target icons are considered to be within the scope of the present invention. For example, while color-coded intensity dots/lines are preferred, the intensity dots can alternatively be displayed by modulating the intensity of a monochrome monitor. Alternatively, the icon graphic can be comprised of a plurality of color-coded intensity dots or a plurality of contour lines connecting range bins of identical reflectivity.

Figure 6A:
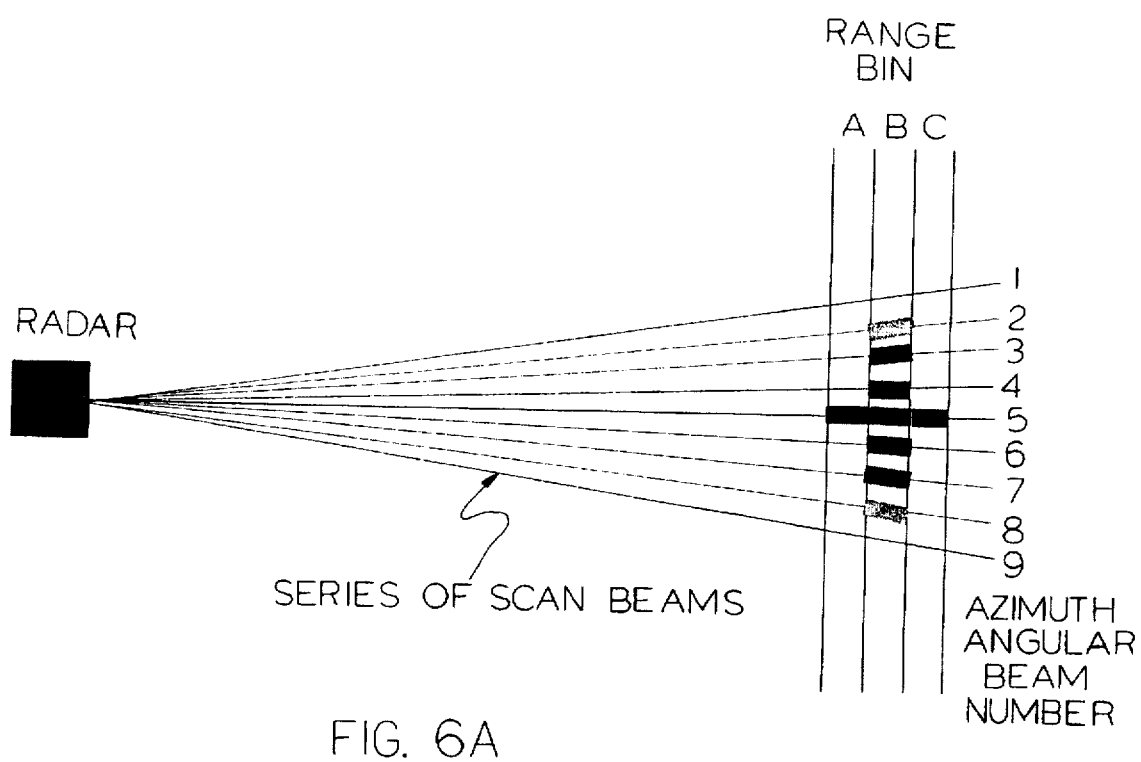
FIG. 6 (FIGS. 6A and 6B) respectively comprise black-white and color representations of an exemplary series of radar beams scanning a target to produce reflected signals in a plurality of range bins which can be displayed as a target icon.
Figure 6B:
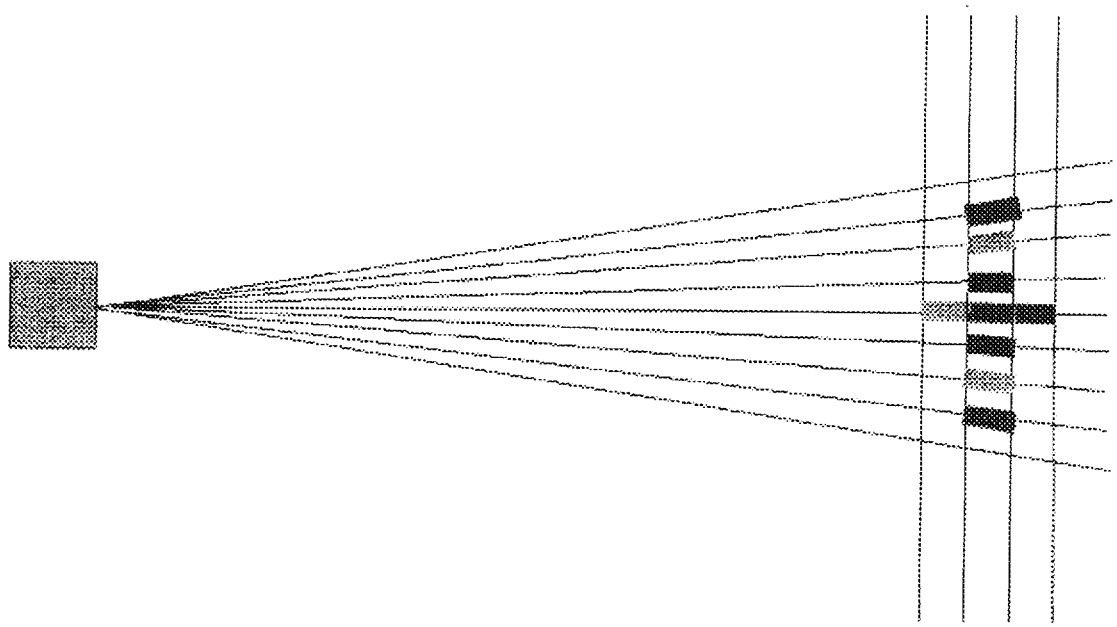

FIG. 6 represents the method of radar scanning a surveillance volume in the azimuth direction to collect target data for displaying a target icon. The radar head emits a series of beams, e.g., 1–9, toward the surveillance volume spaced in the azimuth direction. In an exemplary embodiment, these transmissions are spaced ½ beam width apart for target distances greater than 5 nmi (nautical miles) and ¼ beam width apart for target distances less than 5 nmi (where a typical 3 db beam width is 1.05 degrees). Along each beam, intensity information is gathered in the range direction for each of numerous discrete quantums called range bins, e.g., A, B, C. A range bin is typically 0.0243 nmi in size. As will be later described, a two-dimensional acquisition gate (range by azimuth) is positioned about the centroid of an operator-selected target. These gates gather a matrix of return signal amplitudes along all of the range bins for the azimuth beams about the target. In one embodiment, samples for 20 range bins (approximately 0.486 nmi) for 16 beams about the aircraft are gathered. This information is sent in the form of a synthetic video message to the display processor 18 via data packet path 51. The display processor 18 then produces the displayed synthetic video. As shown in FIG. 6, a hypothetical target return as acquired by the radar is illustrated. Four reflectivity levels are shown in FIG. 4B and are represented (from lowest thresholded return to the highest) in the sequence green, pink, orange, purple. Three range bins about the aircraft are shown labeled A, B and C. As the radar scans sequentially through beam numbers 1 to 9, it gathers reflectivity information as represented by the following table:

| Beam Position | Range Bin of Target Return | Return Intensity | Color Presented on Display |
|---|---|---|---|
| 1 | none | | none |
| 2 | B | Level 1 (lowest) | green |
| 3 | B | Level 2 (low) | pink |
| 4 | B | Level 3 (medium) | orange |
| 5 | A | Level 2 (low) | pink |
| 5 | B | Level 4 (high) | purple |

-continued

| Beam Position | Range Bin of Target Return | Return Intensity | Color Presented on Display |
|---|---|---|---|
| 5 | C | Level 3 (medium) | orange |
| 6 | B | Level 3 (medium) | orange |
| 7 | B | Level 2 (low) | pink |
| 8 | B | Level 1 (lowest) | green |
| 9 | none | | none |

Thus, along azimuth beam 1, we have no returns above the first level, and no synthetic video is produced. Along beams 2, 3 and 4 we have returns in range bin B at the lowest, low, and medium levels. From beam 5, we get returns in range bins A, B and C. These are at low, high, and medium levels. The high level (purple) in bin B indicates the highest reflectivity from the aircraft. The display processor develops an image, i.e., a target icon, similar to that shown in FIG. 6, as magnified and offset by the operator's selection of his azimuth scale and range selection controls. On the Az-El display 62 (see FIG. 4), the target icon is comprised of colored lines or dots along a radial from the radar position. On the width-height indicator (WHI) 110, the elevation beam returns are shown as horizontal lines with the proper scaled vertical separations at the centroided azimuth position of the target. Azimuth beams are shown as vertical lines with the proper scaled horizontal separations at the centroided elevation position of the target. For the WHI, the presented color for each beam representation is that maximum amplitude return for the range bins encountered along the respective elevation or azimuth beam. The production of synthetic video in the elevation direction is performed similarly except that the radar's beam width is typically 0.6 degrees.

The plot generator 96 receives the calculated target centroid for each detected target during each scan (typically approximately once a second) and accumulates a plurality of such centroids (preferably at a rate of multiple times per second). The plot generator 96 then generates a display of at least one past centroid position 106 which when visually combined with the present centroid position 102 is indicative of the path of a detected target.

Optionally, the width-height indicator (WHI) formatter 108 processes data received via path 104 from the plot generator 96 and generates an additional aircraft display 110 having a target icon graphic 112, similar to target icon graphic 100, to show the position of the aircraft relative to the preferred glideslope as viewed from the point of view of the aircraft.

The following describes an exemplary implementation of a preferred embodiment of the present invention.

Signal and Data Processing Signal Flow

Figure 7:
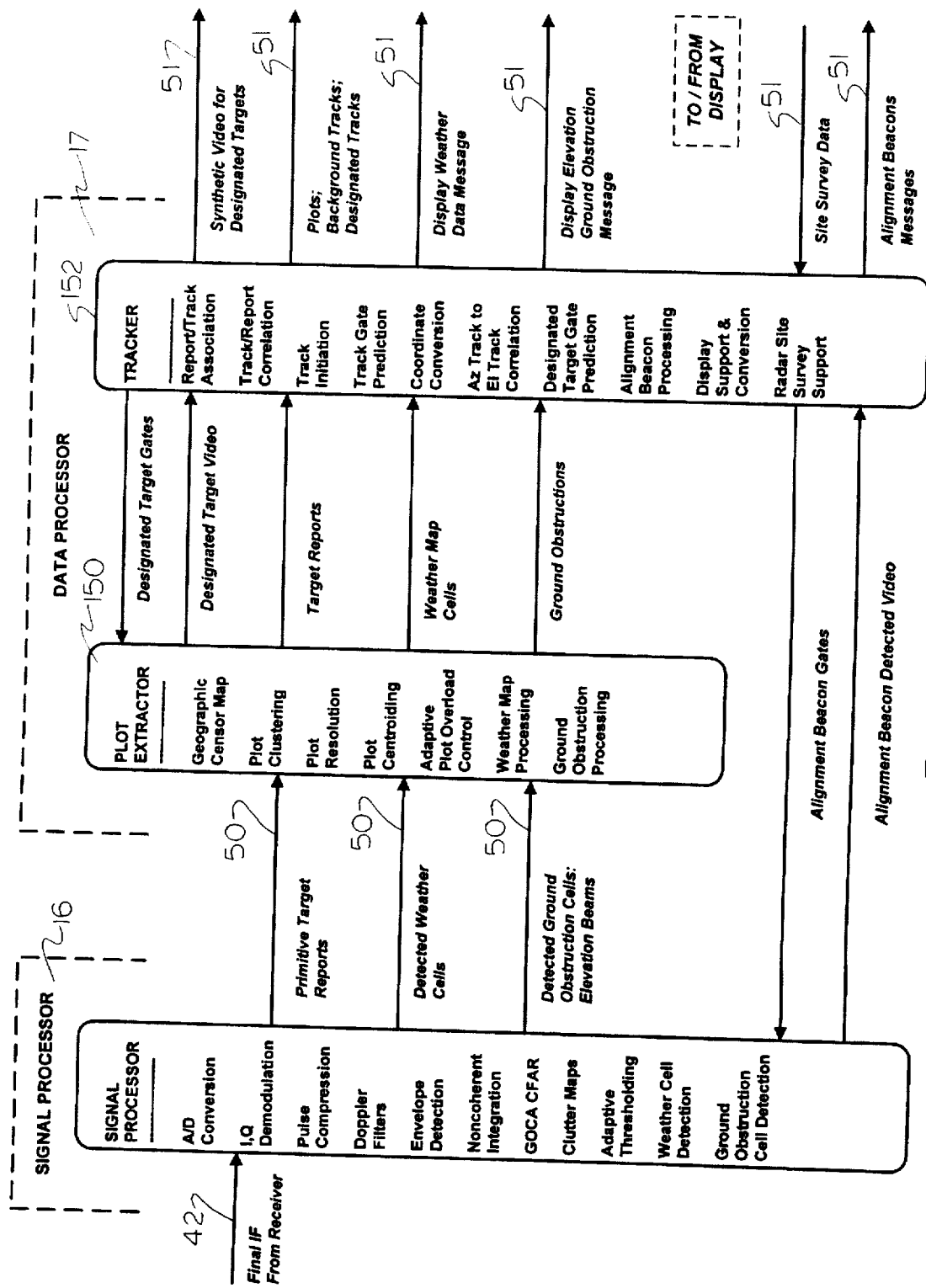
FIG. 7 shows a functional block diagram depicting the signal processor and data processor in an exemplary embodiment.

FIG. 7 shows a functional block diagram of the signal and data processing signal flow in an exemplary embodiment. Final IF is received as an input to the signal processor 16 from the receiver/synthesizer 34. The initial processing step is analog-to-digital conversion to provide digitized IF signals, since modern digital signal processors readily provide the dynamic range required for the subsequent pulse compression, coherent integration and noncoherent integration processing steps.

The digitized IF signals are processed to display data of the following types to the air traffic controller: synthetic video for designated targets, plots for designated targets, plots for background targets, detected weather (precipitation) data, and detected obstruction data.

Target Data—Target data originates as primitive target reports extracted in the signal processor 16 and sent to a plot extractor 150, preferably within the data processor 17 where the reports are clustered to form a contiguous conditional target plot. The conditional plot is tested for possible resolution into two separate plots on the basis of its range-azimuth or range-elevation signal amplitude profiles. Resolved plots are centroided in range-azimuth or in range-elevation to form accurate estimates of their positions which are then forwarded as target reports to a tracker 152, preferably within the data processor 17. In the tracker 152, target reports which correlate with an existing confirmed track are immediately output to the display as plot reports; target reports which do not correlate with existing confirmed tracks are used to initiate new tracks but are not displayed. This assures that plots presented to the air traffic controller are of the highest quality. (Note: This plot-track correlation requirement for plot display is controlled by a site adaptation parameter which allows display of uncorrelated plots using a unique plot symbol to distinguish them from correlated plots if selected by the air traffic controller.)

Synthetic Target Video—For designated targets, two-dimensional acquisition gates (range-by-azimuth and range-by-elevation) are sent by tracker 152 to the plot extractor 150. These gates are centered at the predicted position of the designated target and are used to identify and collect the signal amplitude returns corresponding to range bins and angular beams for the primitive target reports which lie within the acquisition gate. The set of signal amplitudes within the gate is formatted and sent to the tracker 152 as a designated target video report which is immediately forwarded to the monitor 20 as a synthetic video report and presented as synthetic video for the designated targets. This provides the air traffic controller with an extracted video representation of the controlled aircraft in addition to the digital plot symbol, plot history and aircraft identification data block, i.e., the target icon graphic 100. The synthetic video is mapped into 16-level color to present a video quality report for the designated aircraft on the monitor 20. The sequence of color types is selected to naturally indicate importance of information, e.g., colors progressing from "cool" blues and greens indicating low reflectivity to "hotter" oranges, reds, and purples indicating the target's maximum reflectivity and centroid.

Weather Data—In the signal processor 16, the weather data extraction process starts following the standard signal processing steps (discussed below) which consist of pulse compression, digital filtering, and envelope formation. The envelope represents the total signal detected in a given filter for a given 0.3 μsec range bin. For each range bin, a weather filter output envelope and a clutter filter output envelope are adjusted for filter gain differences and summed. The clutter filter and weather filter cover the segment of the Doppler spectrum in which rain may occur for each of the waveforms. From the filter sum, the contents of a clear day map are subtracted to form a difference value. The clear day map allows the elimination of fixed ground clutter returns that might otherwise bias the rain backscatter estimate. This difference value is compared with one of three thresholds (three levels of weather are detected) and a binary decision is made (weather detected/weather not detected) for each range bin. The thresholds are compensated for range and sensitivity time control (STC) as required for each waveform. The binary decision for each 0.3 μsec range bin is collected in a larger 10-bin cell (which corresponds to a range of 0.25 nautical miles (nmi)). If at least 5 of the 10 bins in the cell exceed the weather threshold, weather is declared for that cell. This cell processing aids in suppressing returns from moving targets which might otherwise be declared as backscatter. The result for each 0.25 nmi range cell is reported to the plot extractor 150 in a detected weather cell report.

In the plot extractor 150, the binary detected weather cell reports are collected for each two dimensional weather cell which is 0.25 nmi in range by one beamwidth in angle (azimuth or elevation). Averaging is done both temporally and spatially. Temporal averaging is done over a 30 second period with 10 scans averaged for each of three weather thresholds. Spatial averaging is accomplished by spreading a detection from one weather cell to its eight contiguous neighboring cells. Temporal and spatial averaging aid in suppressing returns from moving targets and in smoothing backscatter contours. Every 30 seconds, the weather cells are thresholded (at least 40 declarations from a possible 90 opportunities) and the cell is assigned the highest level for which weather has been declared: None, level 1, level 2, or level 3. The results of this process are reported to the tracker 152 in the weather map cells report.

The tracker 152 provides the required coordinate conversion for the display and reports the weather data to the display in the display weather data message. The data is presented for the air traffic controller on the monitor 20, using three colors to encode each of the three weather levels.

Obstruction Data—In the signal processor 16, a fine grain ground clutter map (0.3 μsec range bin by 0.5 beamwidth) is developed for both the azimuth coverage sector and the elevation coverage sector. The primary function of the ground clutter map is for adaptive thresholding; however, since it is available, it is used here as a source of obstruction data. The contents of the elevation sector clutter map are displayed on the monitor 20 to alert the air traffic controller to the presence of any obstructions in the path of a controlled aircraft.

In the signal processor 16, the contents of the elevation ground clutter map are compared to a site-selectable range compensated threshold, and the binary result of each resolution map cell to threshold comparison is sent to the plot extractor 150 as a detected ground obstruction cell report. The plot extractor 150 formats the cell reports and forwards them to the tracker 152 as a ground obstructions report. The tracker 152 provides the required coordinate conversion and reports the ground obstruction data to the display processor 18 in the display elevation ground obstruction message. The ground obstruction data is displayed for the air traffic controller in the elevation coverage sector using a single level indicating that the obstruction amplitude exceeds a detection threshold. Obstruction data processing is processed as a background process since it does not involve detection and processing of moving targets; ground obstruction data is renewed on the display at a site-selectable rate.

Signal Processing Algorithms

Figure 8:
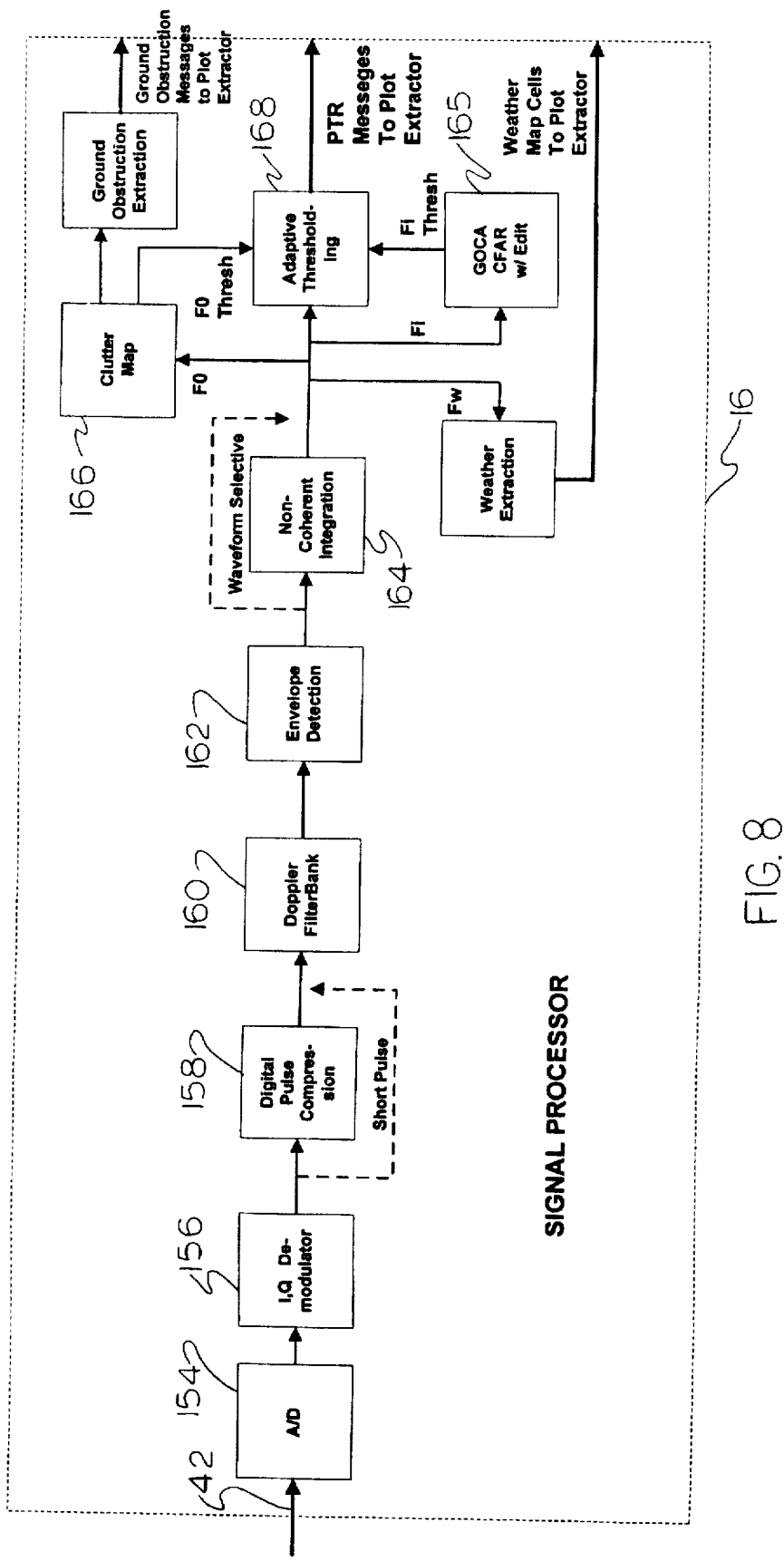
FIG. 8 is a detailed functional block diagram depicting an exemplary signal processor.

FIG. 8 is a detailed block diagram of the functions which comprise an exemplary signal processor 16. A 5 MHz IF received via signal path 42 from receiver/synthesizer 34 is sampled at 20 MHz by a 14-bit A/D 154 and converted from analog to digital prior to down conversion to baseband by a digital I,Q demodulator 156. The digital demodulator 156 establishes the basic 0.3 μsec range sample bin for the signal processor 16 after filtering and reducing the 20 MHz input data stream by a factor of 6. Following I,Q demodulation, testing for saturation and/or pulsed interference (not shown in the figure) is performed and saturation and interference flags are set accordingly. Range bins with these flags set are excluded from certain of the following processing steps, which eliminate these as causes for false target reports.

The signal processor 16 detects moving targets in ground and weather clutter backgrounds, suppresses interference, mapping ground clutter and extracts weather (precipitation) for transmission to the plot extractor 150 in the display processor 18.

Digital pulse compression is next performed by block 158 for each of the waveforms which transmit a nonlinear frequency modulation (NLFM) pulse. Pulse compression restores the range resolution from the transmitted pulsewidth (either 18.6, 40 or 80 μsec) to the compressed pulse width of 0.5 μsec. Nonlinear Frequency Modulation (NLFM) was chosen over other pulse modulation techniques because it offers the best attainable performance between the 3 db compressed pulsewidth, the compressed pulse range sidelobes and the pulse compression processing loss due to sidelobe suppression. The processing loss for the NLFM approach is less than 1.3 db for the required sidelobe level and a 0.5 μsec compressed pulsewidth. Pulse compression is performed in the frequency domain by multiplying the received signal by the complex conjugate of the transmitted waveform. Frequency domain compression was chosen over time domain convolution because it requires considerably less processing.

Doppler filtering is performed next by block 160. A separate filter bank is established for each of the five waveforms. Each waveform filter bank provides a set of N+2 digital FIR filters where N is the number of data pulses (total pulses less fill pulses) transmitted in the waveform. N of the filters are target filters and are positioned in Doppler across the region which contains target Doppler speeds of interest (±20 to ±250 knots). Target filters are designed to have filter sidelobes in the ground clutter and rain clutter region of the Doppler spectrum capable of rejecting on a waveform basis as required (up to 50 db of combined ground and rain clutter and to introduce less than 1.4 db combined weighting and cusping loss). In addition to the target filters, two other filters are provided: a ground clutter filter centered at zero Doppler and a weather filter designed to aid in weather extraction. Narrow-band Doppler filtering provides a signal to noise ratio (SNR) enhancement through coherent integration for target detection in a receiver noise background, suppression of bimodal ground and rain clutter by filter sidelobe design, as well as enhanced target detection in the presence of rain clutter by Doppler separation of moving targets from rain backscatter which is located in only the lowest Doppler filters.

Signal phase is kept through the Doppler filter bank. Following Doppler filtering, the real and imaginary components of the filter output are combined and the envelope of the signal is formed using block 162 discarding phase which is no longer required. Noncoherent integration is next performed on a waveform selective basis using block 164. Noncoherent integration provides an enhancement in target detection.

A Greatest of Cell Averaging (GOCA) Constant False Alarm Rate (CFAR) algorithm is performed by block 165 and used to develop the noise estimate that will be used to threshold each of the N target filters. A separate CFAR estimate is developed for each filter. A sliding leading and lagging 16 cell window is established for each filter about each range bin of interest. Two guard cells on either side of the cell of interest are excluded from the windows to prevent the target itself from influencing the estimate. An edit function is used to exclude samples from a possible second target located within either 16 cell window, and the largest of the two windows is then selected for the noise estimate. This algorithm has a processing loss of less than 1.7 db. CFAR based thresholds are very effective in detecting targets in rain where noise levels are likely to vary significantly as a function of range, while simultaneously rejecting false target detections due to rain clutter residues in the filters.

The ground clutter filter (Filter 0) is thresholded using a fine grain clutter map 166. The resolution of the map is equal to the resolution of the radar (0.3 μsec by 0.5 beamwidths). Ground clutter is nonhomogeneous and cannot be thresholded using cell averaging CFAR. The Filter 0 (F0) output is temporally averaged using a recursive filter which averages the filter response over a selectable 8 to 24 scan period. The previous result is read from the map, combined with the current input to form the current threshold, and then returned to the map. The fine grain clutter map provides an effective means for adaptively thresholding the F0 filter. The map eliminates most false detections due to ground clutter, while simultaneously supporting detection of aircraft with tangential or near tangential velocities not otherwise visible. This is done by asserting that any zero Doppler detections outside of clutter mapped areas are zero radial velocity aircraft.

The final processing step is adaptive thresholding using block 168. The F0 filter is thresholded using the clutter map value. The target filters are thresholded using the GOCA CFAR noise estimate. Target filter thresholds are augmented when significant clutter is detected in the F0 filter by the known level of clutter residue introduced into that filter. A short range (2 nmi) residue map is maintained for each target filter for use as a threshold at ranges below where full range CFAR processing is effective. The residue map uses a recursive filter identical to that of the clutter map. In all cases, adaptive thresholds below a minimum threshold are replaced by the minimum threshold. All threshold detections are then sent by the signal processor 16 via path 50 to the plot extractor 150 as primitive target report messages.

Although the present invention has been described in detail with reference only to the presently-preferred embodiments, those of ordinary skill in the art will appreciate that various modifications can be made without departing from the invention. For example, one of ordinary skill in the art can envision other embodiments that include different partitioning of the described functions between the radar head controller and the display controller, including but not limited to embodiments in which the functions of the display processor are included within the signal processor. Furthermore, additional functionality can be provided to the present invention. For example, an alignment beacon, e.g., an MTI reflector, can be placed at predefined position, preferably proximate to the runway, and the signal processor 16 and/or the display processor 18 can adapt the displayed output to correspond to any differences between the measured and defined position. Accordingly, the invention is defined by the following claims.

I claim:

1. A ground based precision approach radar (PAR) system for visually displaying to an air traffic controller the relationships between a runway, an aircraft target within a three dimensional approach space proximate to said runway, a preferred glideslope to a runway touchdown point, and weather systems within said space, said system comprising:
   an azimuth antenna configured to emit a source signal within a prescribed angular window and receive a reflected azimuth signal in response thereto;
   an elevation antenna configured to emit a source signal within a prescribed angular window and receive a reflected elevation signal in response thereto;
   said azimuth and elevation antennas being positioned proximate to said runway;
   receiver means coupled to said azimuth antenna for receiving said reflected azimuth signal and coupled to said elevation antenna for receiving said reflected elevation signal;
   a controller for sweeping said azimuth antenna prescribed angular window through a defined horizontal arc and said elevation antenna prescribed angular window through a defined vertical arc;
   said controller including means for modulating said azimuth antenna source signal in coordination with said sweeping of said azimuth antenna prescribed angular window and means for modulating said elevation antenna source signal in coordination with said sweeping of said elevation antenna prescribed angular window;
   a target filter coupled to said receiver means for producing a digital target signal in response to said reflected azimuth and elevation signals having velocity and/or size properties characteristic of an aircraft;
   a weather filter coupled to said receiver means for producing a digital weather signal in response to reflected azimuth and elevation signals having velocity and/or size properties characteristic of weather systems;
   a display monitor for visually representing said three dimensional space including said runway; and
   a display processor responsive to said target signal and said weather signal for causing said monitor to respectively display a target icon and a weather icon within said three dimensional representation.

2. The radar system of claim 1 wherein said controller additional includes means for modulating said azimuth and elevation antenna source signals to produce a first modulated signal suitable for detecting an aircraft target and a second modulated signal suitable for detecting a weather system and means for emitting a pattern of said first and second modulated signals in coordination with said sweeping of said azimuth and elevation antennas prescribed angular windows.

3. The radar system of claim 1 additionally comprising an obstruction filter coupled to said receiver means for producing a digital obstruction signal in response to said reflected azimuth and elevation signals having a velocity characteristic of an obstruction; and wherein
   said display processor is additionally responsive to said obstruction signal for causing said monitor to display an obstruction icon within said three dimensional representation.

4. The radar system of claim 1 wherein said display processor additionally comprises a target graphic generator for correlating a set of said target signals as a single target and displaying on said monitor said target signal set as a target icon comprised of a plurality of color-coded patterns indicative of intensities of a plurality of said reflected azimuth and elevation signals.

5. The radar system of claim 4 wherein said target graphic generator additionally calculates a centroid average of each target signal set and displays on said monitor said centroid as a portion of said target icon.

6. The radar system of claim 5 wherein said target graphic generator additionally displays on said monitor at least one past centroid position for each target signal set.

7. The radar system of claim 1 wherein said monitor additionally displays vertical and horizontal position data corresponding to a target offset from said preferred glideslope.

8. The radar system of claim 1 additionally comprising:
   a secondary antenna for horizontally sweeping a third source signal and receiving a returned identification signal; and wherein said monitor additionally displays said identification signal.

9. The radar system of claim 1 wherein said display processor additionally comprises a weather graphic generator for partitioning said weather signal into a plurality of precipitation sets corresponding to different intensities of said reflected azimuth and elevation signals and displaying said precipitation sets as said weather icon on said monitor.

10. The radar system of claim 1 additionally comprising:
   a prepositioned alignment beacon; and
   means for processing said reflected azimuth and elevation signals from said beacon to adjust said target filter.

11. The radar system of claim 1 wherein said display monitor three dimensional representation includes side and top views.

12. A ground based precision approach radar (PAR) system for visually displaying to an air traffic controller the relationships between a runway, an aircraft target within a three dimensional approach space proximate to said runway, a preferred glideslope to a runway touchdown point, and weather systems within said space, said system comprising:
   an azimuth antenna configured to emit a source signal within a prescribed angular window and receive a reflected azimuth signal in response thereto;
   an elevation antenna configured to emit a source signal within a prescribed angular window and receive a reflected elevation signal in response thereto;
   said azimuth and elevation antennas being positioned proximate to said runway;
   receiver means coupled to said azimuth antenna for receiving said reflected azimuth signal and coupled to said elevation antenna for receiving said reflected elevation signal;
   a controller for sweeping said azimuth antenna prescribed angular window through a defined horizontal arc and said elevation antenna prescribed angular window through a defined vertical arc;
   said controller additional includes means for modulating said azimuth and elevation antenna source signals to produce a first modulated signal suitable for detecting an aircraft target and a second modulated signal suitable for detecting a weather system and means for emitting a pattern of said first and second modulated signals in coordination with said sweeping of said azimuth and elevation antennas prescribed angular windows;
   a target filter coupled to said receiver means for producing a digital target signal in response to said reflected azimuth and elevation signals having velocity and/or size properties characteristic of an aircraft;
   apparatus for producing a weather signal;
   a display monitor for visually representing said three dimensional space including said runway; and
   a display processor responsive to said target signal and said weather signal for causing said monitor to respectively display a target icon and a weather icon within said three dimensional representation.

13. The radar system of claim 12 wherein said display processor additionally comprises a target graphic generator for correlating a set of said target signals as a single target and displaying on said monitor a target icon representative thereof.

14. The radar system of claim 13 wherein said target icon comprises a coded pattern indicative of the intensities of said reflected azimuth and/or elevation signals related to a single target.

15. The radar system of claim 14 wherein said coded pattern is color coded.

16. The radar system of claim 13 wherein said target graphic generator additionally calculates a centroid average of each target signal set and displays on said monitor said centroid as a portion of said target icon.

17. The radar system of claim 16 wherein said target graphic generator additionally displays on said monitor at least one past centroid position for each target signal set.

18. The radar system of claim 12 wherein said monitor additionally displays vertical and horizontal position data corresponding to a target offset from said preferred glideslope.

19. The radar system of claim 12 additionally comprising:
   a secondary antenna for horizontally sweeping a third source signal and receiving a returned identification signal; and wherein
   said monitor additionally displays said identification signal.

20. The radar system of claim 12 wherein said display processor additionally comprises a weather graphic generator for partitioning said weather signal into a plurality of precipitation sets corresponding to different intensities of said reflected azimuth and elevation signals and displaying said precipitation sets as said weather icon on said monitor.

21. The radar system of claim 12 additionally comprising:
   a prepositioned alignment beacon; and
   means for processing said reflected azimuth and elevation signals from said beacon to adjust said target filter.

22. The radar system of claim 12 additionally comprising an obstruction filter coupled to said receiver means for producing a digital obstruction signal in response to said reflected azimuth and elevation signals having a velocity characteristic of an obstruction; and wherein
   said display processor is additionally responsive to said obstruction signal for causing said monitor to display an obstruction icon within said three dimensional representation.

23. The radar system of claim 12 wherein said display monitor three dimensional representation includes side and top views.

24. A ground based precision approach radar (PAR) display for visually displaying to an aircraft controller the relationships between a runway, an aircraft target within a three dimensional approach space, a preferred glideslope to a runway touchdown point, and weather systems within said space in response to a pattern of scanned radar beams and common reflected azimuth and elevations signals received in response thereto and used to produce both target and weather signals, said display comprising:
   a target graphic generator for generating a target icon corresponding to said target signal;
   a weather graphic generator for generating a weather icon corresponding to said weather signal; and
   a display monitor for visually representing said three dimensional space including said runway;
   a display processor responsive to said target signal and said weather signal for causing said monitor to respectively display a target icon and a weather icon within said three dimensional representation.

25. The radar system of claim 24 wherein said display monitor three dimensional representation includes side and top views.

26. The radar display of claim 24 wherein said common reflected signals are additionally used to produce an obstruction signal, said display additionally comprising an obstruction graphic generator for generating an obstruction icon; and wherein
   said monitor additionally displays said obstruction icon relative to said runway and preferred glideslope.

* * * * *